June 27, 1961 E. J. JOHNSTON 2,989,835
SIDE DELIVERY RAKE TOOTH MOUNTING
Filed Feb. 17, 1959
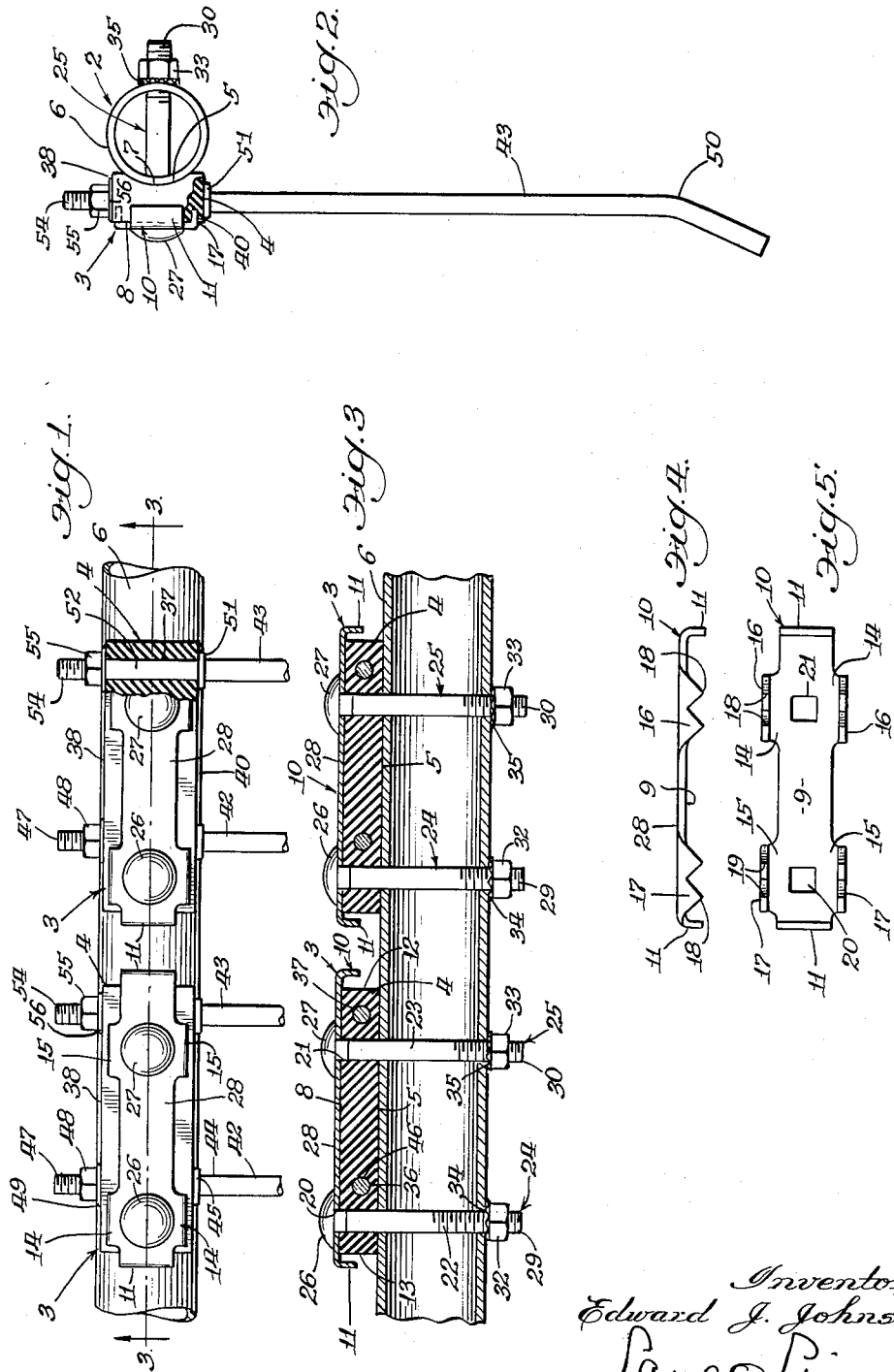
Inventor:
Edward J. Johnston
Paul O. Pippel
Atty.

United States Patent Office 2,989,835
Patented June 27, 1961

2,989,835
SIDE DELIVERY RAKE TOOTH MOUNTING
Edward J. Johnston, Cicero, Ill., assignor to International Harvester Company, Chicago, Ill., a corporation of New Jersey
Filed Feb. 17, 1959, Ser. No. 793,895
9 Claims. (Cl. 56—400)

This invention relates to side delivery rakes or other harvesting machinery which employs teeth for raking in material.

For many years past and in current practice the rake teeth of the type under consideration have been made with a coil spring portion, one end of which terminates in a loop or the like for securing the tooth to an associated structure such as a tooth bar of a side delivery rake, the other end of which comprises a tooth which is adapted to engage and move the material. The intent of such prior art construction has been to provide sufficient deflection for the tooth so that it meets varying conditions such as undulating ground and different crop masses on the theory that the tooth would yield and therefore bypass the obstruction. In actual practice, however, such theoretical expectations have not been realized. One of the most vexing problems for the farmer is in the breaking off of such teeth and invariably these teeth start breaking off almost from the moment that the machinery is put in operation.

I have discovered through actual high speed photography in closely analyzing the problems involved that one of the most deleterious causes of tooth breakage has been the setting up of harmonic vibrations which continuously and violently vibrate all of the teeth around the entire reel structure in the case of side delivery rakes and that this continuous vibration rapidly fatigues the metal and causes such premature failure.

It is an object of this invention to provide a novel and effective mounting for rake teeth which entirely obviates the foregoing disadvantages.

Another object of the invention is to provide a novel inexpensive method of mounting and fastening rake teeth which provides the necessary deflection and at the same time dampens the vibrations normally set up in such previous structures.

A more specific object of the invention is to provide a novel mounting of the rake teeth which is simple and effective and wherein means are provided for adjusting the flexibility of the tooth.

A still further object of the invention is to provide a novel mounting for a rake tooth wherein the tooth is provided with a root end portion which is connected through a piece of elastomer material to the supporting structure.

These and other objects of the invention will become more apparent from the specification and the drawings, wherein:

FIGURE 1 is a fragmentary side elevational view of a portion of a rake bar with the novel tooth construction mounted thereon fragmentarily shown in section;

FIGURE 2 is an end elevational view with parts broken away and partially in section of the structure shown in FIGURE 1;

FIGURE 3 is an axial sectional view taken substantially on the line 3—3 of FIGURE 1;

FIGURE 4 is a side edge view of the mounting clamp; and

FIGURE 5 is an interior side view of the clamp shown in FIGURE 4.

Describing the invention in detail and having particular reference to the drawing there is shown in FIGURE 1 a support or a tooth bar 2 of a side delivery rake such as for example shown in U.S. Patent 2,861,415.

Such a tooth bar normally mounts a plurality of rake teeth and these in the present instance are shown as tooth assemblies 3, 3.

Each tooth assembly comprises a body of elastomer material generally designated 4 which comprises a pad or block of fiber impregnated rubber material such as tire carcass which is preferably rectangular extending lengthwise generally axially of the support bar 2 and having a back side 5 abutting against the outer periphery 6 of the tooth bar 2 and pressed thereagainst so as to deform as at 7 and contact the curved periphery 6 along an arcuate area. The outer side 8 of the pad is engaged by the flat internal side 9 of a combination retainer and pressure distributing clamp 10 which is preferably an elongated member of a length greater than the length of the pad and at each end having inwardly extending stiffening lugs 11 and 11 which loosely confine the opposite ends 12, 13 of the associated pad. Adjacent to each end there are provided transversely outwardly projecting lugs 14—14 and 15—15 with inwardly projecting toothlike flange portions 16—16 and similarly the flanges 15 are provided with inwardly projecting toothlike flange portions 17—17, portions 14 having sharp points 18 portions 17 having sharp points 19 which are adapted to dig into and penetrate the pad material 4.

The lugs 14 and 15 are disposed in alignment with apertures 20 and 21 through which extend shanks 22 and 23 of bolts generally designated 24 and 25, the bolts 24 and 25 having heads 26 and 27 which engage the outer side 28 of the platelike structure 10 of the clamp. The opposite ends 29 and 30 of bolts 24 and 25 are threaded and have nuts 32 and 33 threaded thereon which may be provided with self-locking means 34, 35 respectively engaging the peripheral surface 6 of the tube or support 2. The pad 4 is provided with apertures 36 and 37 which extend from the top longitudinal edge 38 through the bottom longitudinal edge 40 of the pad and these openings 36 and 37 are preferably in the form of drillings and are each located adjacent to a bolt 24 and 25 respectively, that is, the opening 36 is located close to bolt 24 and the opening 37 close to bolt 25.

A pair of tines or teeth 42 and 43 which are preferably made of suitable material such as steel or the like are carried and mounted on the pad 4. The tine 42 has its tooth portion 44 which depends from its mounting and the tooth portion is provided with a shoulder 45 at its inner end from which extends a root portion 46, the said root portion projecting through the opening 36 and at its distal end is threaded as at 47 upon which is threaded a nut 48 which abuts through a washer 49 against the edge 38 of the pad while the shoulder abuts against the edge 40 of the pad. Similarly tooth 43 is provided with a tine portion 50 which at its inner end is provided with a shoulder 51 which abuts against the side 40 of the pad, the shoulder merging with the root portion 52, the said root portion 52 extending through the aperture 37 and at upper end being threaded as at 54 and provided with a nut 55 which through a washer 56 engages the edge 38 of the pad.

A feature of the present invention is in the two-way adjustability of the flexibility of the tooth namely by adjusting the position of the nut portions 48 or 55 the pad portion between the respective nuts 48 and shoulder 45 and nut 55 and shoulder 51 obtains a predetermined compression of the rubber which is confined between these nuts and shoulders and between the clamp and support. In addition by providing the bolts 24 and 25 in the vicinity of the root ends of the teeth by varying the tension on the respective bolts compresses or relieves the pressure on the respective areas of the pads. Therefore, the flecture of the elastomer material is controlled in at least two directions by varying vertical and horizontal compression.

It will be understood that the foregoing description and embodiment of the invention has been chosen merely by way of illustration and not limitation and that other forms of the invention will become readily apparent to those skilled in the art within the scope of the appended claims.

What is claimed is:

1. In a rake tooth mounting, a tubular rake bar, a pad of fiber impregnated rubber material elongated axially of the bar and seated at one side thereagainst, a clamp engaging the opposite side of the pad, a pair of bolts adjacent to opposite ends of the clamp extending through aligned openings in the clamp, pad and bar, nuts on the ends of the bolts in engagement with the side of the bar remote from the pad, said bolts having heads engaging the clamp on a side remote from the pad, said pad having a pair of apertures extending transversely of the bar adjacent to each bolt generally perpendicular thereto, a pair of teeth each having a root portion extending through respective apertures and having a shoulder in engagement with an edge of the pad extending between the clamp and bar, and a nut threaded on each root portion and engaging a side of the pad opposite said last-mentioned side thereof, said pad being compressed against the bar and at its side engaging the bar being deformed into an arcuate contour conforming to the shape of the bar.

2. A rake tooth mounting comprising a support, a pad or block of elastomer material adjacent said support, securing means interengaging said support and said pad or block, a rake tine having an end portion extending into said pad or block, said end portion lying alongside said support.

3. The invention acording to claim 2 and said securing means being adjustable and compressing said material under varying pressures.

4. The invention according to claim 2 and said securing means extending alongside said end portion of the tine and adjustable in tension for varying the flexibility of the material.

5. The invention according to claim 2 and said pad or block of material being impregnated with fiber.

6. The invention acording to claim 2 and said securing means comprising a nut and bolt assembly extending through said material and support adjacent to said end portion of the tine, and said assembly adjustable in tension for varying the compression of said material and thus its flexibility.

7. The invention according to claim 2 and said end portion of the tine having means thereon receiving said pad or block of material therebetwen and adjustable to vary the compression thereof to thus adjust the movement of the tine.

8. The invention according to claim 2 and said end portion of the tine extending through said block or pad of material and having adjustable means thereon engaging said pad or block and compressing the same therebetween, and said securing means comprising a tension assembly extending transversely adjacent to the end portion of the tine and adjustable in tension and compressing said block or pad against the support.

9. The invention according to claim 2 and said securing means comprising a clamp engaging said pad or block along substantially the entire extent thereof on a side thereof remote from the support.

References Cited in the file of this patent

UNITED STATES PATENTS

| 227,604 | Witter | May 11, 1880 |
| 2,328,121 | Bartek | Aug. 31, 1943 |
| 2,364,303 | Martin | Dec. 5, 1944 |
| 2,627,159 | Russel | Feb. 3, 1953 |
| 2,704,150 | Scranton | Mar. 15, 1955 |
| 2,856,216 | Witzel | Oct. 14, 1958 |
| 2,888,993 | Dunning | June 2, 1959 |
| 2,909,889 | Gustafson | Oct. 27, 1959 |